US008196720B2

(12) United States Patent
Deconti

(10) Patent No.: US 8,196,720 B2
(45) Date of Patent: Jun. 12, 2012

(54) BRAKE APPARATUS AND METHOD

(75) Inventor: John Deconti, Bristol, CT (US)

(73) Assignee: D-Brake LLC, New Britain, CT (US)

( * ) Notice: Subject to any disclaimer, the term of this patent is extended or adjusted under 35 U.S.C. 154(b) by 1188 days.

(21) Appl. No.: 11/329,300

(22) Filed: Jan. 10, 2006

(65) Prior Publication Data
US 2007/0158151 A1    Jul. 12, 2007

(51) Int. Cl.
F16D 65/10 (2006.01)
F16D 65/00 (2006.01)

(52) U.S. Cl. ............ 188/264 R; 188/264 D; 188/264 P; 303/3; 192/113.23

(58) Field of Classification Search ............ 188/264 R, 188/264 A, 264 AA, 264 B, 264 D, 264 F, 188/264 CC, 264 P, 352, 71.6, 151 R, 163, 188/166; 192/18 A, 113.23, 70.12; 303/3, 303/15
See application file for complete search history.

(56) References Cited

U.S. PATENT DOCUMENTS

| | | | | | |
|---|---|---|---|---|---|
| 2,068,062 | A | * | 1/1937 | Metten | 192/85 R |
| 2,290,542 | A | * | 7/1942 | Criley | 192/113.23 |
| 2,498,123 | A | * | 2/1950 | Hobbs | 192/113.35 |
| 2,517,972 | A | * | 8/1950 | Cardwell et al. | 192/88 A |
| 2,844,227 | A | * | 7/1958 | Armstrong | 188/151 R |
| 3,303,911 | A | * | 2/1967 | Hause et al. | 188/264 E |
| 3,330,391 | A | * | 7/1967 | Mamo | 192/85 AA |
| 4,271,937 | A | | 6/1981 | Hatch et al. | |
| 4,321,990 | A | * | 3/1982 | Koch, Jr. | 192/13 R |
| 4,483,422 | A | * | 11/1984 | Cory | 188/71.5 |
| 4,565,265 | A | * | 1/1986 | Woolley | 188/72.6 |
| 4,926,629 | A | * | 5/1990 | Eick et al. | 60/39.281 |
| 5,003,828 | A | * | 4/1991 | van den Burg | 73/861.33 |
| 5,003,829 | A | * | 4/1991 | DeConti et al. | 73/862.12 |
| 5,101,941 | A | * | 4/1992 | Long et al. | 188/290 |
| 5,148,894 | A | * | 9/1992 | Eddy, Jr. | 188/72.6 |
| 5,176,227 | A | * | 1/1993 | Kohler | 188/59 |
| 5,329,890 | A | * | 7/1994 | Mueller | 123/90.17 |
| 5,358,036 | A | | 10/1994 | Mills | |
| 5,358,077 | A | * | 10/1994 | DeConti | 188/71.6 |
| 5,429,425 | A | * | 7/1995 | Drott | 303/3 |
| 6,119,819 | A | * | 9/2000 | Von Kaler | 188/71.5 |
| 6,123,645 | A | * | 9/2000 | Hopper | 477/164 |
| 6,491,139 | B1 | | 12/2002 | Budica et al. | 188/71.6 |

(Continued)

FOREIGN PATENT DOCUMENTS

CN    2150112 Y    12/1993

(Continued)

OTHER PUBLICATIONS http://dbrake.com—history link and the products link, 2007.*

(Continued)

*Primary Examiner* — Melody Burch
(74) *Attorney, Agent, or Firm* — Cantor Colburn LLP

(57) ABSTRACT

The disclosed apparatus relates to a liquid cooled brake apparatus comprising: a housing, a brake cooling pump mounted to said housing, a braking force actuator mounted to said housing, said actuator being driven by a first driven member; and a braking force applicator in operable communication with said braking force actuator and a brake rotor, the rotor rotationally fixed to said first or a second driven member. The disclosed method relates to a method of retarding a driven member comprising: driving a braking force actuator with a first driven member, actuating a braking force applicator; and retarding the rotation of a rotor rotationally fixed to said first or a second driven member.

20 Claims, 11 Drawing Sheets

U.S. PATENT DOCUMENTS

2004/0168865 A1* 9/2004 Kuivamaki ................ 188/71.2

FOREIGN PATENT DOCUMENTS

| GB | 1346193 A | | 6/1974 |
|---|---|---|---|
| JP | 59142391 A | * | 8/1984 |
| SU | 1041353 A | * | 9/1983 |

OTHER PUBLICATIONS

PCT International Search Report Application No. PCT/US2006/046393, May 14, 2007.
Australian Office Action for corresponding AU Application No. 2006335265, dated Apr. 21, 2011, pp. 1-2.
Chinese Office Action for corresponding CN Application No. 2006800508385, dated Jan. 10, 2011, pp. 1-17 China.
Chinese Office Action for corresonding CN Application No. 2006800508385, dated Feb. 5, 2010, pp. 1-16 China.
Chinese Office Action for corresonding CN Application No. 2006800508385, dated Sep. 2, 2010, pp. 1-10 China.
Great Britain Office Action for corresponding GB Application No. 0812765.6, dated Jun. 1, 2010, pp. 1-3 Great Britain.
International Search Report and Written Opinion for PCT/US2006/046393, dated May 14, 2007, pp. 1-12.
Chinese Office Action for corresponding CN Application No. 2006800508385, dated Dec. 12, 2011, pp. 1-16.
Chinese Office Action for CN Application No. 2006800508385, dated Apr. 11, 2011, pp. 1-7.

* cited by examiner

BRAKE APPARATUS AND METHOD

BACKGROUND OF THE INVENTION

The disclosed invention relates to an apparatus and method for retarding a driven member. This invention has applications in transportation, dynamometers, conveyor systems and mining to name a few. In transportation, for example, when a truck is descending down a long grade the vehicle's air-cooled original equipment manufacturer brakes can overheat, this overheating condition is exacerbated when the truck is carrying a heavy load. The heat generated by the friction of the brake pads against the disc, for disc brakes, or brake shoes against the drums, for drum brakes, can reduce braking efficiency.

Accordingly there is a need in the art for an improved frictional braking system.

BRIEF DESCRIPTION OF THE INVENTION

The disclosed apparatus relates to a liquid cooled brake apparatus comprising: a housing, a brake cooling pump mounted to said housing, a braking force actuator mounted to said housing, said actuator being driven by a first driven member; and a braking force applicator in operable communication with said braking force actuator and a brake rotor, the rotor rotationally fixed to said first or a second driven member.

The disclosed method relates to a method of retarding a driven member comprising: driving a braking force actuator with a first driven member, actuating a braking force applicator; and retarding the rotation of a rotor rotationally fixed to said first or a second driven member.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of several embodiments of the disclosed apparatus and method are presented herein by way of exemplification and not limitation with reference to the Figures.

Figure 1:
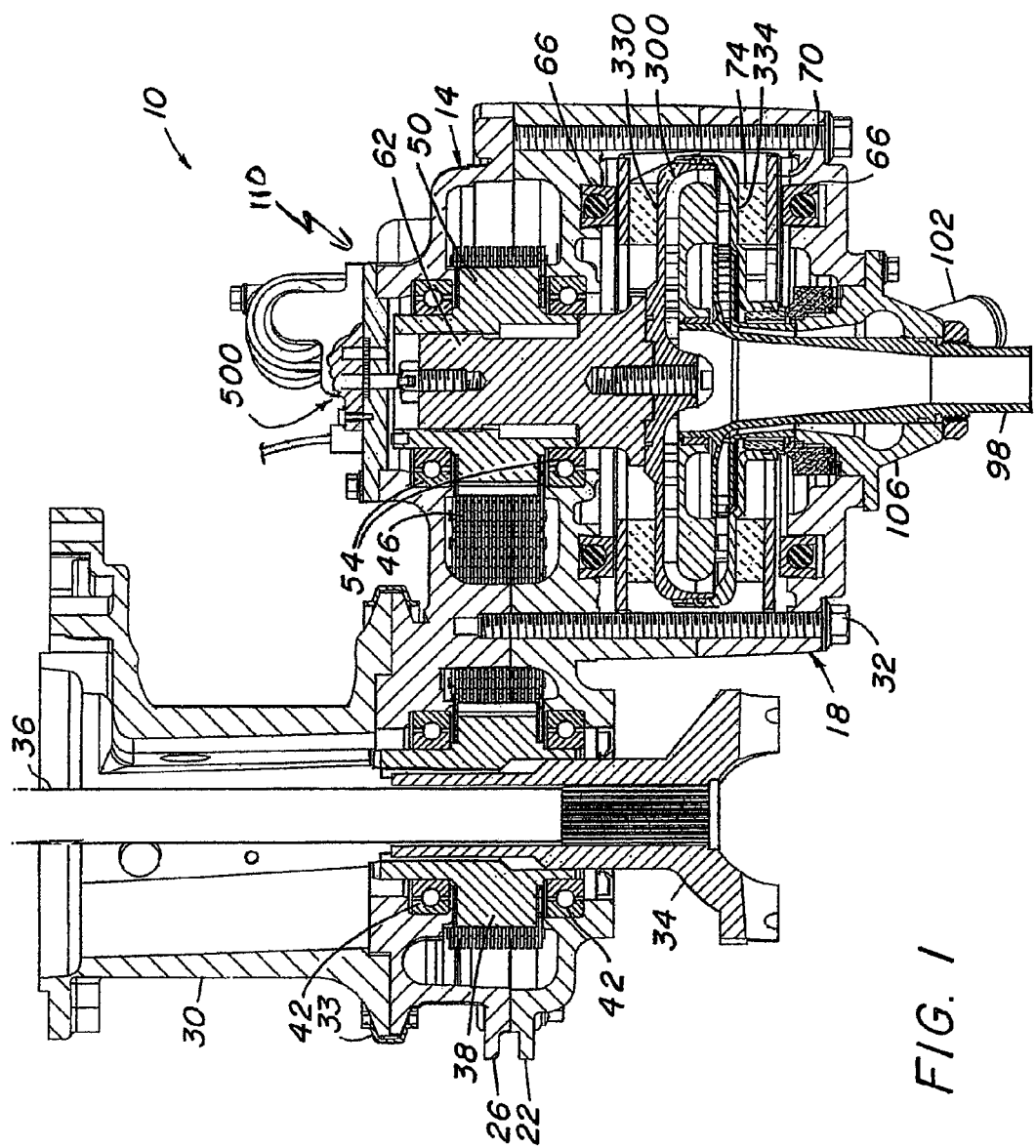
FIG. 1 depicts a cross sectional view of a brake apparatus of an embodiment of the invention.
Figure 2:
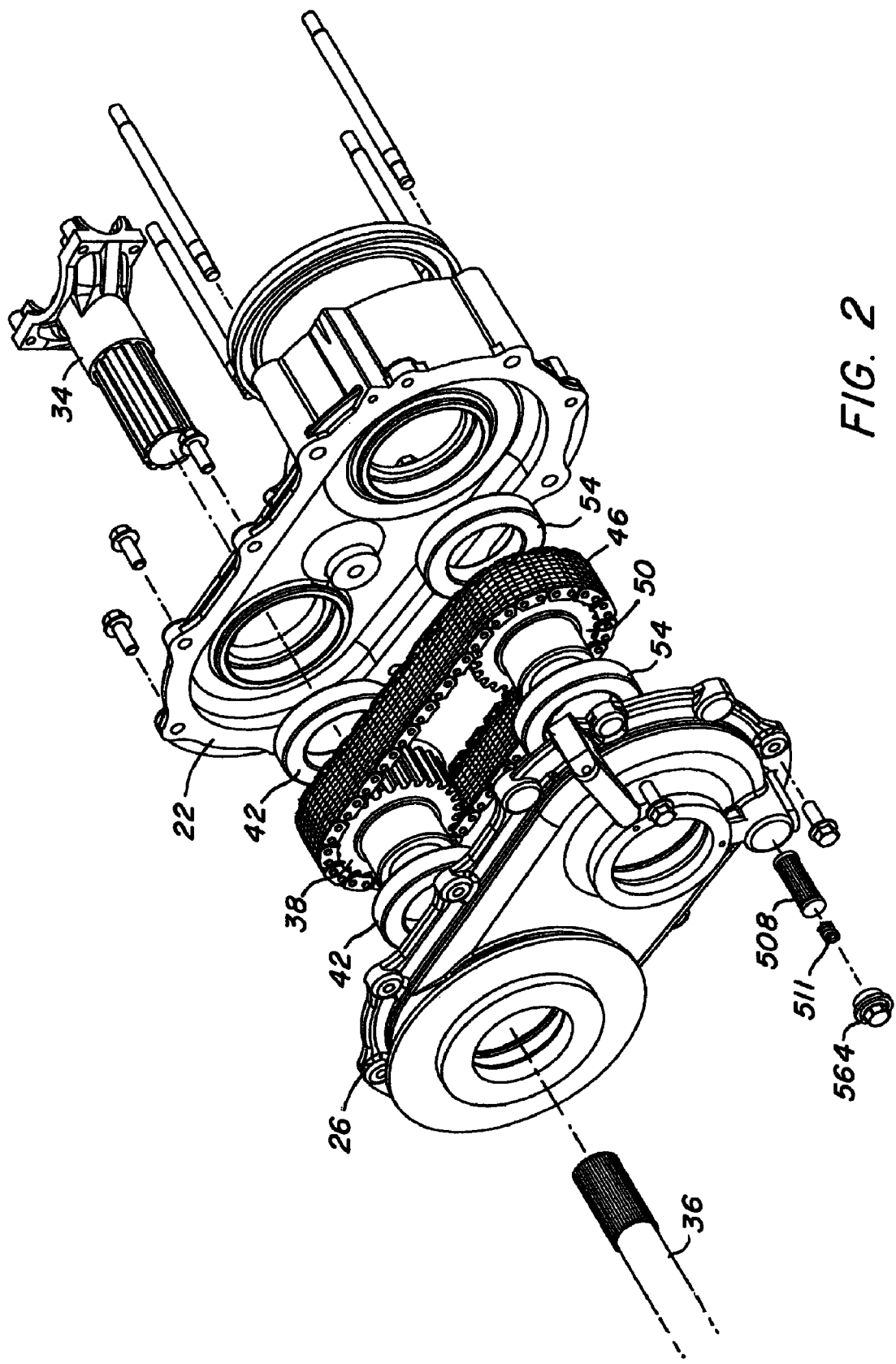
FIG. 2 depicts an exploded perspective view of the chain and sprocket assembly shown in FIG. 1.

Referring to FIGS. 1 and 2, a brake assembly 14 comprising: a brake housing 18, a rear chain case 22, a front chain case 26, an outlet housing 106 and a tail housing 30 are sealedly attached to one another to generally form a structure for supporting the components that comprise a friction brake apparatus 10. Studs 32 fasten the brake housing 18, rear chain case 22 and front chain case 26 together, while band clamp 33 attaches the tail housing 30 to the front chain case 26. A first driven member, illustrated in one embodiment as a universal joint coupling (or yoke or slip yoke) 34, is rotationally fixed to a drive sprocket 38 that rotates within the brake assembly 14 on bearings 42. Alternately, a second driven member, illustrated in one embodiment as a tail shaft 36, may be rotationally fixed to the universal joint coupling 34, which is rotationally fixed to the drive sprocket 34, or it may be rotationally fixed to the drive sprocket 38 directly, while allowing axial movement. A chain 46 engaged with drive sprocket 38 drives a rotor sprocket 50 on bearings 54. The rotor sprocket 50 is rotationally fixed to a brake rotor 300 through a brake shaft 62. Through the above-described linkages the brake rotor 300 is rotationally fixed to either the first or the second driven member. It should be appreciated by one skilled in the art that the chain 46, as described herein, is only an exemplary embodiment for rotationally fixing the brake rotor 300 with the driven member and other embodiments such as a belt or gear set, for example, may also be utilized.

The frictional brake apparatus 10 hinders the rotation of the universal joint coupling 34 by hindering the rotation of the brake rotor 300 that is rotationally fixed to the universal joint coupling 34 as described above. A braking force applicator illustrated in one embodiment here as pistons 66, brake pad plates 70 and brake pads 74, apply a braking force to the brake rotor 300. The brake rotor 300 has opposing outside axial brake surfaces 330 and 334 that are engaged by the brake pads 74 that are attached to the brake pad plates 70. The brake pads 74 are urged against the brake surfaces 330, 334 by pistons 66. The urging force of the pistons 66 results from hydraulic pressure generated in a braking force actuator 110. The actuator utilizes hydraulic force as a function of pressure to move the pistons 66 to apply the braking (retarding) force. The braking force actuator is illustrated in one embodiment here as a gear pump 500 that will be described in more detail with reference to FIGS. 7-9. It should be appreciated by those skilled in the art, that alternate embodiments such as a gerotor or piston pump, for example, may be used as the braking force actuator while remaining within the scope of the invention.

The brake pad plates 70 are slidably engaged with the brake assembly 14 to substantially limit the travel of the brake pad plates 70 to a direction parallel to the axis of the brake rotor 300. It should be appreciated, by one skilled in the art, that pistons urging brake shoes against a drum type rotor could also be employed in other embodiments of the invention. The portion of the system described above is similar to the types of frictional braking systems, the drawbacks of such are identified in the background section of this application. The system herein described however, further includes a brake surface cooling pump operatively communicated with the system. In one illustrated embodiment of the invention the cooling pump resides within the brake rotor 300. The pump includes internal pumping blades that are described in greater detail with reference to FIGS. 3-5. The purpose for the cooling pump is to circulate a fluid in conductive communication with the brake rotor friction surface to remove heat from the brake rotor 300 and surrounding components generated by the friction of the brake pads 74 against the brake surfaces 330, 334. The cooling pump pumps cooling liquid, to and from the brake apparatus 10, through inlet nipple 98, and outlet nipple 102 formed in the outlet housing 106. The cooling fluid may be routed through a vehicle radiator (not shown) or other heat-exchanging device (not shown) located near, on or remotely from the brake apparatus 10 of the invention.

Figure 3:
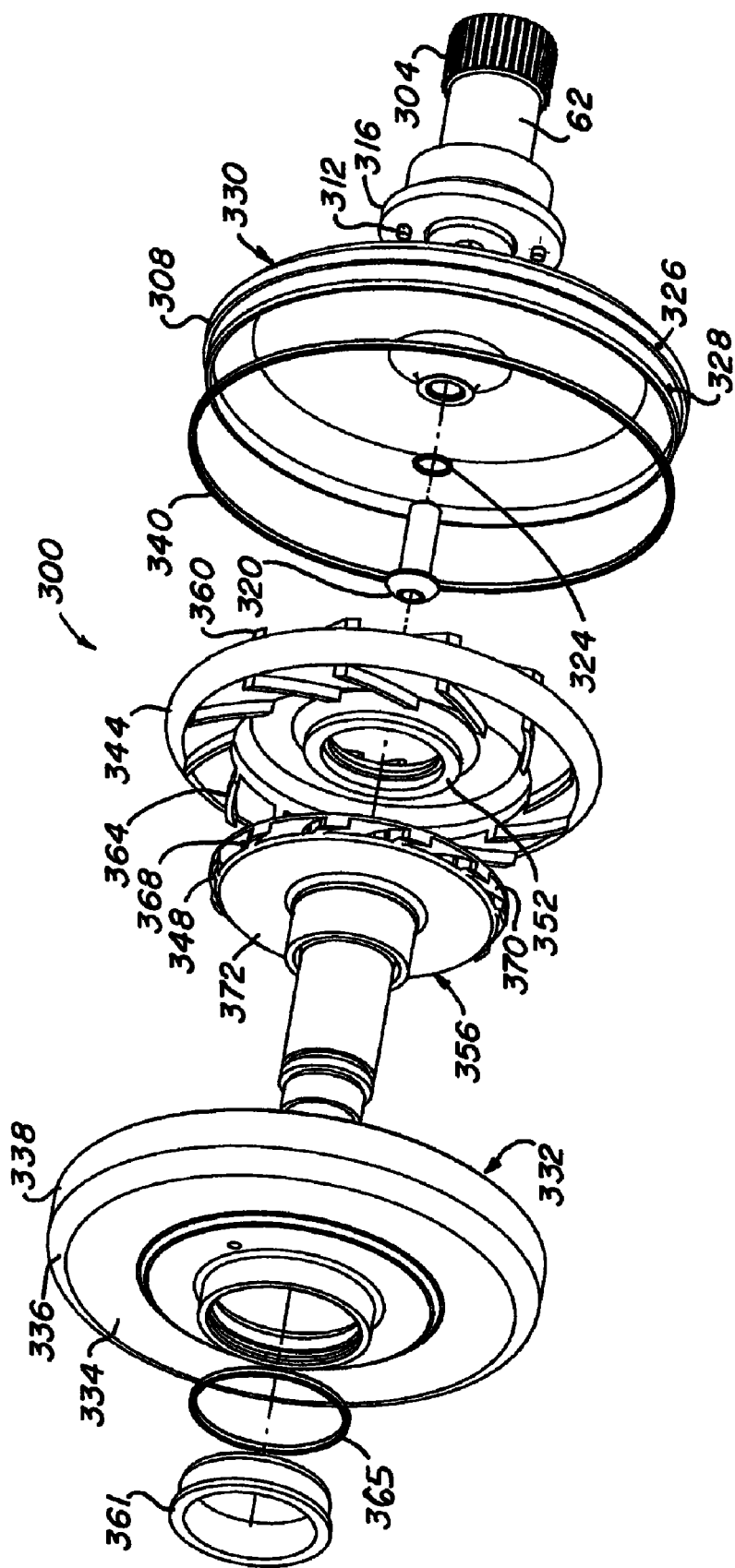
FIG. 3 depicts an exploded perspective view of a brake rotor of an embodiment of the invention.

Referring now to FIG. 3, an exploded view of the brake rotor 300, shows details of the internal cooling pump. Pumping of cooling fluid is facilitated by the rotation of several components within the brake rotor 300; the rotor sprocket 50 driven by the chain 46 provides the driving force for this rotation. The brake shaft 62 is rotationally fixed to the rotor sprocket 50 by a spline 304 located on one end of the brake shaft 62. A flange 316 on the rotor side of the brake shaft 62 is rotationally fixed to a drive plate 308 by two axially protruding posts 312 that engage with bottom cylindrical recesses (not shown) in the drive plate 308. A button head bolt 320 and o-ring 324 fix the drive plate 308 to the brake shaft 62 axially. Through the above arrangement the drive plate 308 is rotationally fixed to the rotor sprocket 50.

Several other components within the brake rotor 300 are also rotationally fixed to the drive plate 308. The drive plate 308 has an outer peripheral surface 328 that extends axially beyond the drive plate brake surface 330 and has outer diameter threads 326 thereon. A seal plate 336 has an outer peripheral surface 338 that extends axially beyond the seal plate brake surface 334 and has inner diameter threads 332, thereon, that thread into the outer diameter threads 326 of the drive plate 308. An o-ring 340 diametrically seals the drive plate 308 to the seal plate 336.

Figure 4:
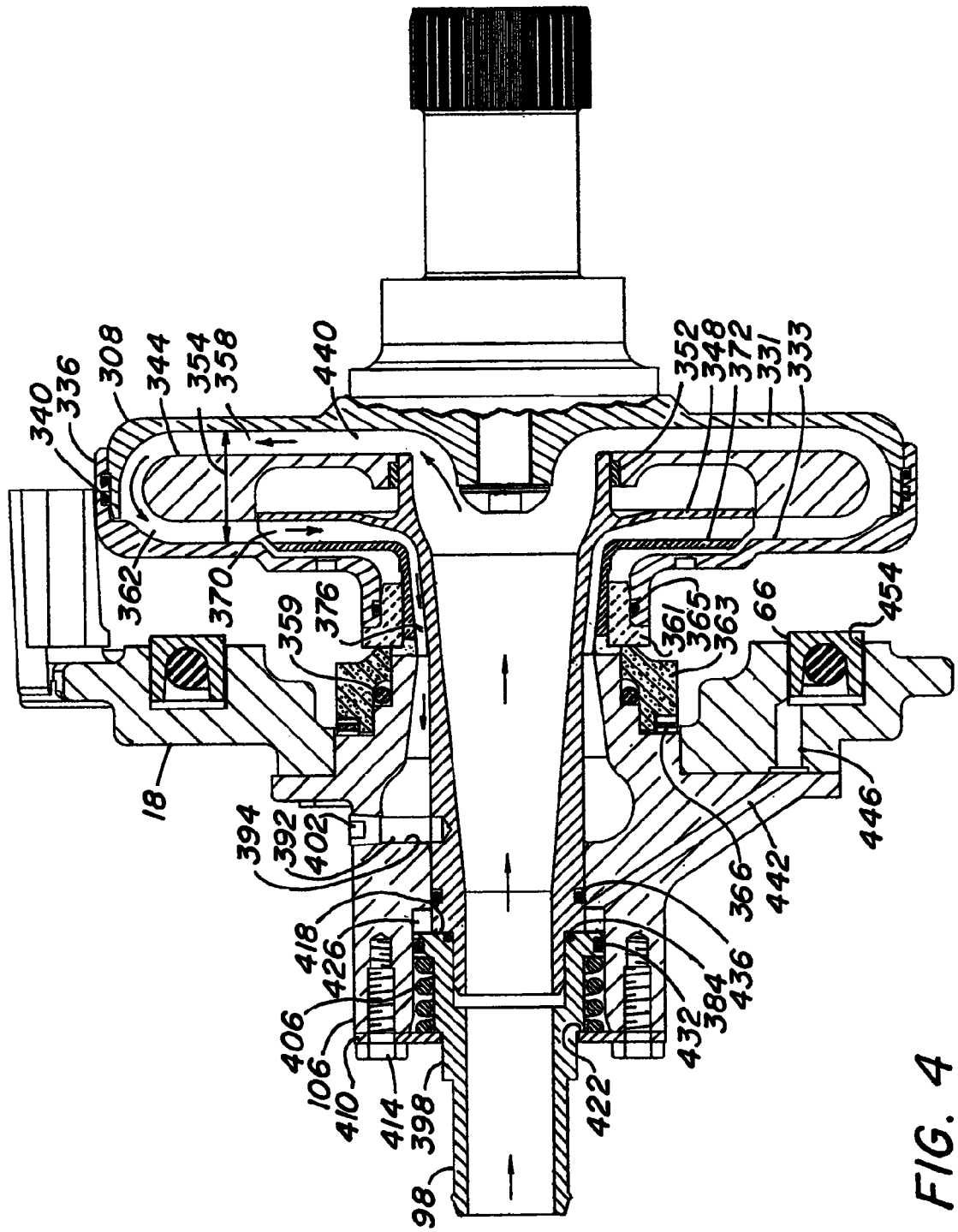
FIG. 4 depicts a cross sectional view of a brake rotor and stator assembly with the stator assembly in the opened fluid flow path position according to an embodiment of the invention.
Figure 5:
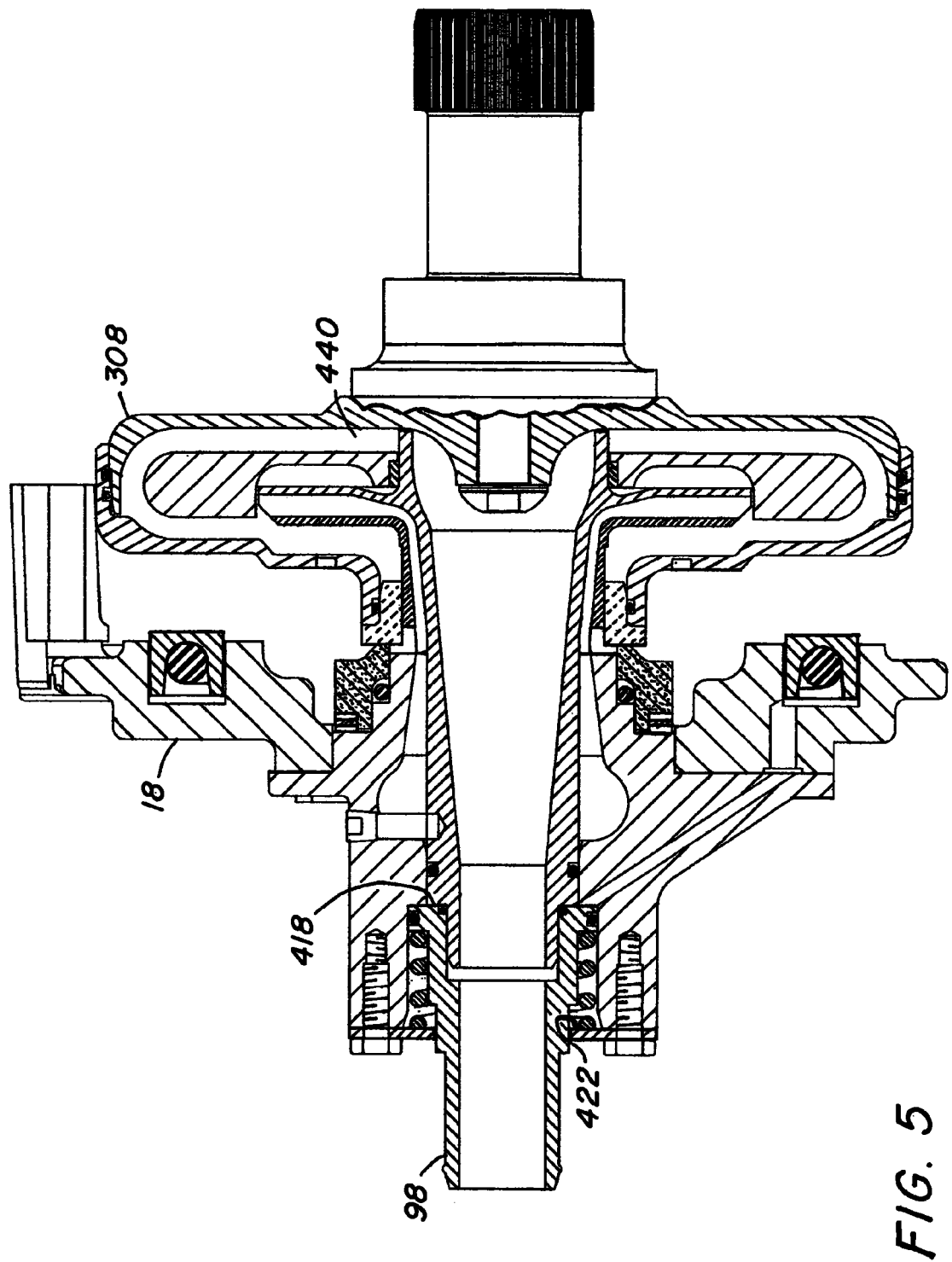
FIG. 5 depicts a cross sectional view of the brake rotor and stator assembly of FIG. 4 with the stator assembly in the closed fluid flow path position.

Referring now to FIGS. 3 through 5 sandwiched between the drive plate 308 and the seal plate 336 is a rotor disc 344, and a stator assembly 356 comprising a stator flange 348 and a stator blade plate 372. The rotor disc 344 bisects the rotor cavity 354 into a first cavity 358 and a second cavity 362. The rotor disc 344 is rotationally locked to, and therefore, rotates with the plates 308 and 336, while the stator assembly 356 is not locked to the plates 308, 336 and therefore does not rotate with the plates 308 and 336. A rotor disc bearing 352 positions the stator assembly 356 concentric to the rotor disc 344 as the rotor disc 344 rotates relative to the stator assembly 356. An o-ring 365 seals a ceramic face seal 361 to the seal plate 336 in a center hole therethrough. The ceramic face seal 361 seals dynamically to a carbon face seal 363 that is rotationally fixed to the outlet housing 106 and sealed to the outlet housing 106 by o-ring 359. A wave spring 366 urges the carbon face seal 363 against the ceramic face seal 361 to maintain the face-to-face contact required for the seal. The smoothness of the ceramic face seal 361 against the low friction, highly durable surface of the carbon face seal 363 establishes a low torque long life seal design. Other materials having appropriate properties to substitute for the ceramic for the seal 361 include but are not limited to tungsten carbide, silicon carbide or heat-treated steel for example.

The cooling fluid pumping action is generated by the rotation of the rotor disc 344 and more specifically a set of first blades 360 and a set of second blades 364 formed on opposing sides of the rotor disc 344. The cooling fluid is propelled radially outward in the first cavity 358 by the first blades 360, axially around the outer diameter of the rotor disc 344, radially inward in the second cavity 362 by the second blades 364 and radially inward into channels 370 of the stator assembly 356. The channels 370 of the stator assembly 356 are formed by the axial space between the stator blade plate 372 and the stator flange 348, and by stator blades 368 formed on the stator blade plate 372. The cooling fluid flows axially from the channels 370 into an annular flow path 376 formed by the radial clearance between the stator flange 348 and the stator blade plate 372. This fluid is contained by the sliding seal of the ceramic face seal 361 to the carbon face seal 363, described above, and is ported to the outlet nipple 102 of the outlet housing 106. Thus, the pumping action pumps fluid along surfaces 331 and 333 which are the surfaces just opposite the drive plate brake surface 330 and the seal plate brake surface 334 respectively, thereby carrying away heat from the plates 308, 336 in the process.

An embodiment of the invention ports the inlet cooling fluid along the axis of the rotor within the stator flange 348 and ports the outlet cooling fluid coaxial with the inlet fluid along an external portion of stator flange 348. This construction permits an internal dynamic seal to be formed by the rotor disc bearing 352, which seals the rotating rotor disc 344 to the stationary stator flange 348. The sealing integrity of this seal is not critical since any leakage is still contained completely internal to the fluid flow paths, thus the designation as "internal dynamic seal." Conversely, the other dynamic seal, the one created by the ceramic face seal 361 to the carbon face seal 363, described above, is not contained within the fluid flow paths and is therefore described as an "external dynamic seal" and any leakage by it will allow coolant to escape the closed cooling system of the vehicle, a condition that should be avoided. The construction of this embodiment, specifically having the inlet flow along the axis of the rotor, allows for a single external dynamic seal to be used. Whereas alternate constructions, that do not port either the inlet or the outlet flow along the axis of rotation, require at least two external dynamic seals; one between each stationary flow nipple and the rotating, coolant filled, rotor assembly.

The cooling fluid enters the brake apparatus 10 (FIG. 1) through the inlet nipple 98. For assembly purposes the inlet nipple 98 is threadably attached to the stator flange 348 and sealed thereto with o-ring 384. A hole 388 formed in the stator flange 348 accepts a pin 392 through a hole 394 in the outlet housing 106 that prevents the stator flange 348 from rotating while the inlet nipple 98 is threaded onto the stator flange 348 via a hex shape 398 on its perimeter. After assembly the pin 392 is removed and the hole 394 in the outlet housing 106 is plugged with a plug 402.

As with any pumping mechanism, the work performed during the pumping operation consumes energy. One exemplary embodiment of the invention permits reduction in the energy consumption of the brake apparatus 10 (FIG. 1), by stopping or reducing the pumping of cooling fluid during times when cooling is not necessary, such as when the brake apparatus 10 is not engaged in a braking action. To enable or disable the pumping action, the stator assembly 356 is repositionable relative to the brake assembly 14 and the drive plate 308 in an axial direction. A cooling fluid flow path 440 is formed by the axial clearance between the stator flange 348 and the drive disc 308. When the stator assembly 356 moves towards the drive disc 308, into a first position, the flow path 440 is blocked, thereby stopping the pumping action. When the stator assembly 356 moves away from the drive disc 308, into a second position, the flow path 440 is opened and the pumping action is allowed.

To permit the repositioning of the stator assembly 356, a compression stator spring 406 is housed between the inlet nipple 98 and a hex plate 410. The hex plate 410 is attached to the outlet housing 106 with bolts 414. The stator spring 406 urges the stator assembly 356 towards the drive disc 308 until a stator flange shoulder 418 bottoms out against the outlet housing 106. Conversely, the stator assembly 356 is axially movable in the opposite direction, a direction away from the drive disc 308, until the stator blade plate 372 contacts the outlet housing 106. The force to move the stator assembly 356 away from the drive plate 308 is generated by hydraulic oil pressure in a pressure chamber 426. (The pressure is ported to the pressure chamber 426 through seventh pressure port 442 and sixth pressure port 446 that fluidically connect a piston cavity 454 with stator pressure cavity 426, as will be described in more detail with reference to FIGS. 7-9). The pressure in stator pressure chamber 426 causes the stator assembly 356 to move axially, thereby opening coolant flow path 440, as was described above. The pressure chamber 426 is formed in an annular cavity between the outlet housing 106 and the stator flange 348 that are sealed to each other by o-ring 436. The inlet nipple 98, which is sealed to the outlet housing 106 by o-ring 432, and to the stator flange 348 by o-ring 384, caps the end of the pressure chamber 426. O-rings (or other radial seals) 436 and 432 create sliding seals between the stator assembly 356 and the outlet housing 106 and also provide alignment of the stator assembly 356 within the brake assembly 14 on one end of the stator assembly 356. The stator flange 348 riding within an inner diameter of the rotor disc bearing 352 aligns the other end of the stator assembly 356. Thus, cooling fluid flow path 440 is closed due to the stator spring 406 urging the stator assembly 356 towards the drive disc 308 in response to a drop in oil pressure in pressure chamber 426. And conversely, the fluid flow path 440 is opened in response to an increase in oil pressure in pressure chamber 426, compressing the stator spring 406 while moving the stator assembly 356 away from the drive disc 308. It should be understood by those skilled in the art, that alternate embodiments such as a solenoid, for example, may be used to actuate the movement of the stator assembly 356 to open and close the fluid flow path 440 while remaining within the scope of the invention.

Figure 6:
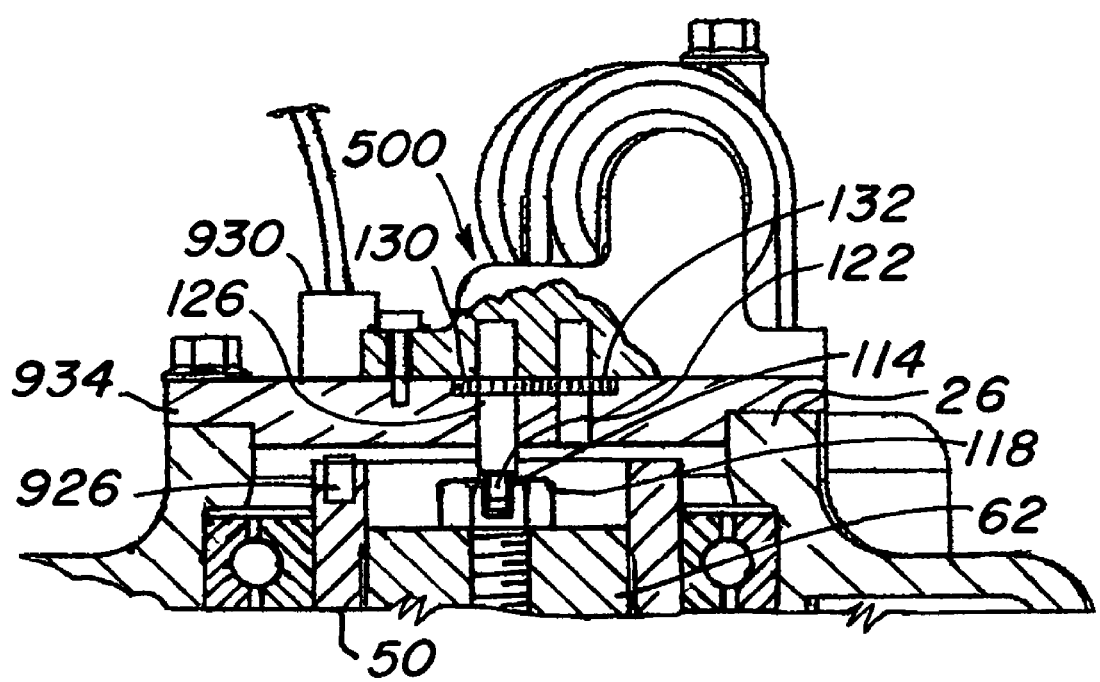
FIG. 6 depicts a partial cross sectional view of FIG. 1 at a larger scale.

Referring now to FIG. 6, the hydraulic pressure that pressurizes the pressure chamber 426 is generated by gear pump 500 attached to the front chain case 26. This gear pump 500 also provides the hydraulic oil to the pistons 66 described above. The gear pump 500 is a positive displacement pump housed within a gear plate 934 that is attached to the front chain case 26. A drive gear 130 meshes with and drives a driven gear 132. The driving force for the drive gear 130 is provided by the brake shaft 62 through a slotted bolt 118 threadably attached to the brake shaft 62. A protruding tab 122 on a drive gear shaft 126 engages a drive slot 114 in the slotted bolt 118. Thus, the drive gear 130 is rotationally fixed to the brake shaft 62, which is rotationally fixed to the universal joint coupling 34, and thus pumps hydraulic oil whenever the universal joint coupling 34 is rotating. Through the above linkage, the braking force actuator, illustrated here as the gear pump 500 is driven by the first driven member, illustrated here as the universal joint coupling 34. It should be appreciated, by one skilled in the art, that the braking force actuator may be driven by the first driven member and the brake rotor rotationally fixed to the second driven member, or it may be driven by an external source such as an electric motor or as an accessory driven off a prime mover, while still remaining within the scope of the invention.

Figure 7:
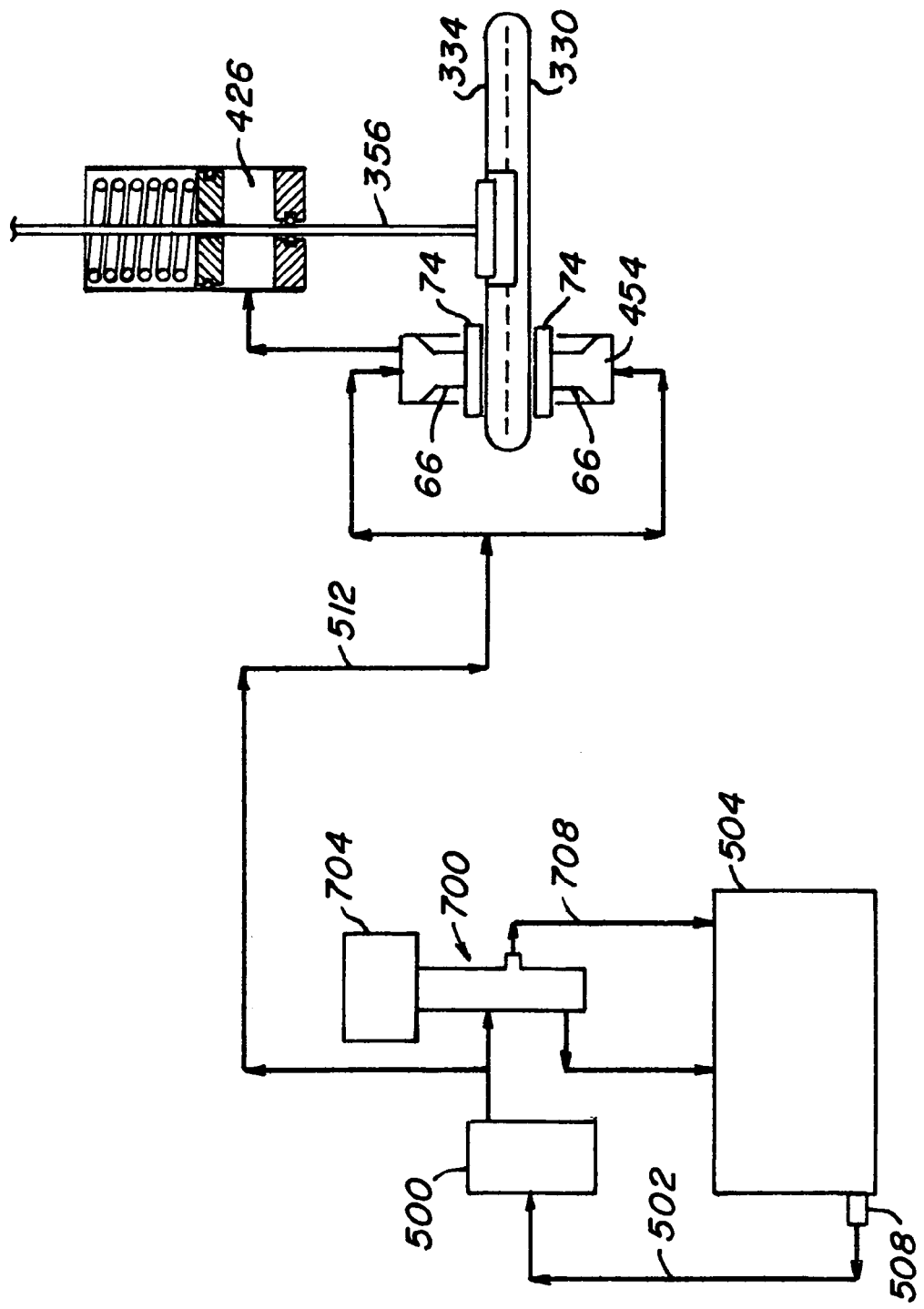
FIG. 7 depicts a hydraulic schematic of an embodiment of the invention.

Referring now to FIG. 7, a schematic for a hydraulic system of an embodiment of the invention will be reviewed. The positive displacement gear pump 500 generates low pressure in suction port 502 connecting the pump 500 to an oil sump 504 through a filter 508 thereby drawing filtered oil into the pump 500. The outlet of the pump 500 is connected in parallel through pressure port 512 to the pistons cavities 454, the stator pressure chamber 426, and to a needle valve 700.

Figure 8:
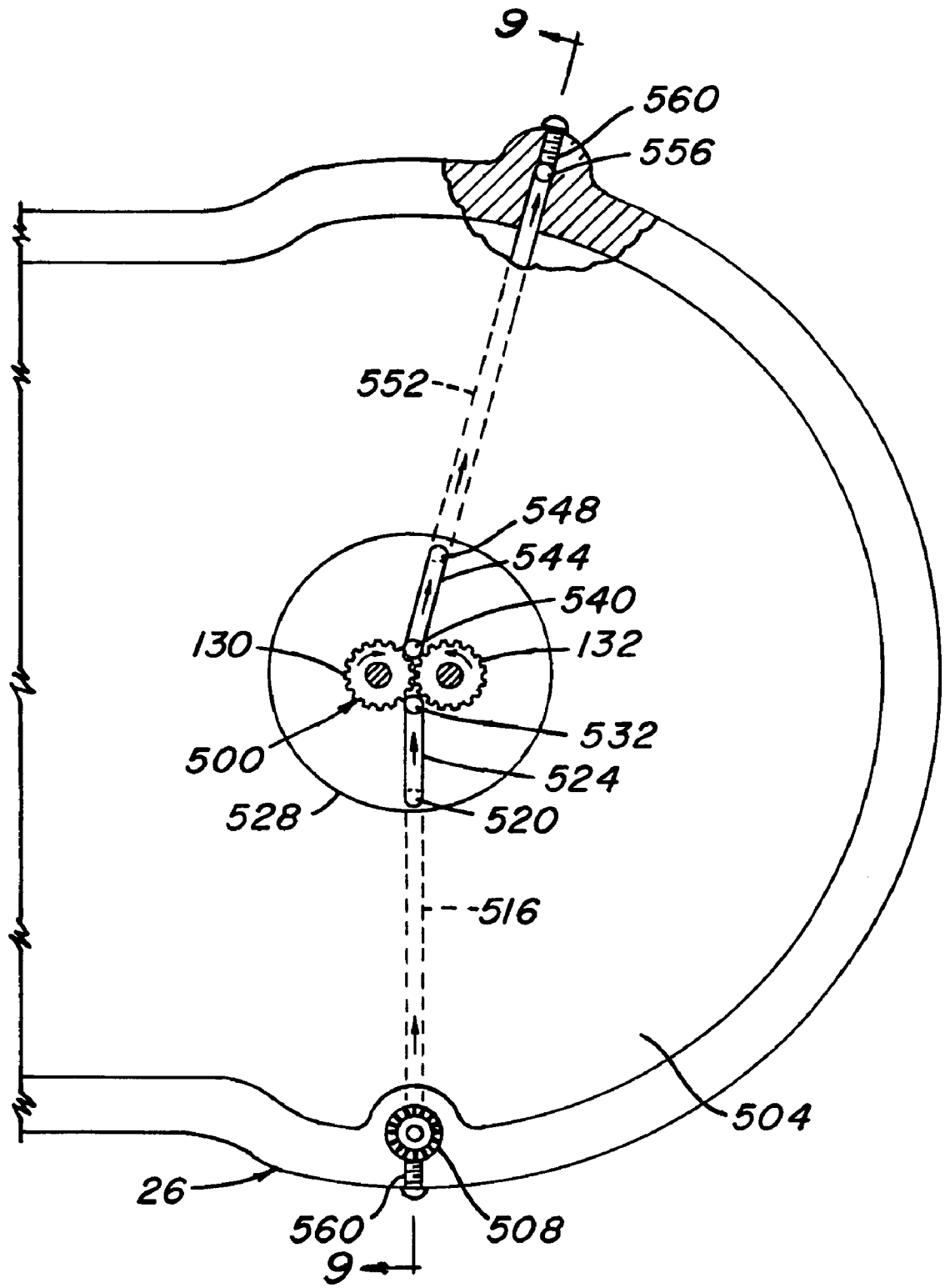
FIG. 8 depicts a partial cross sectional view of a gear pump and housing of an embodiment of the invention.
Figure 9:
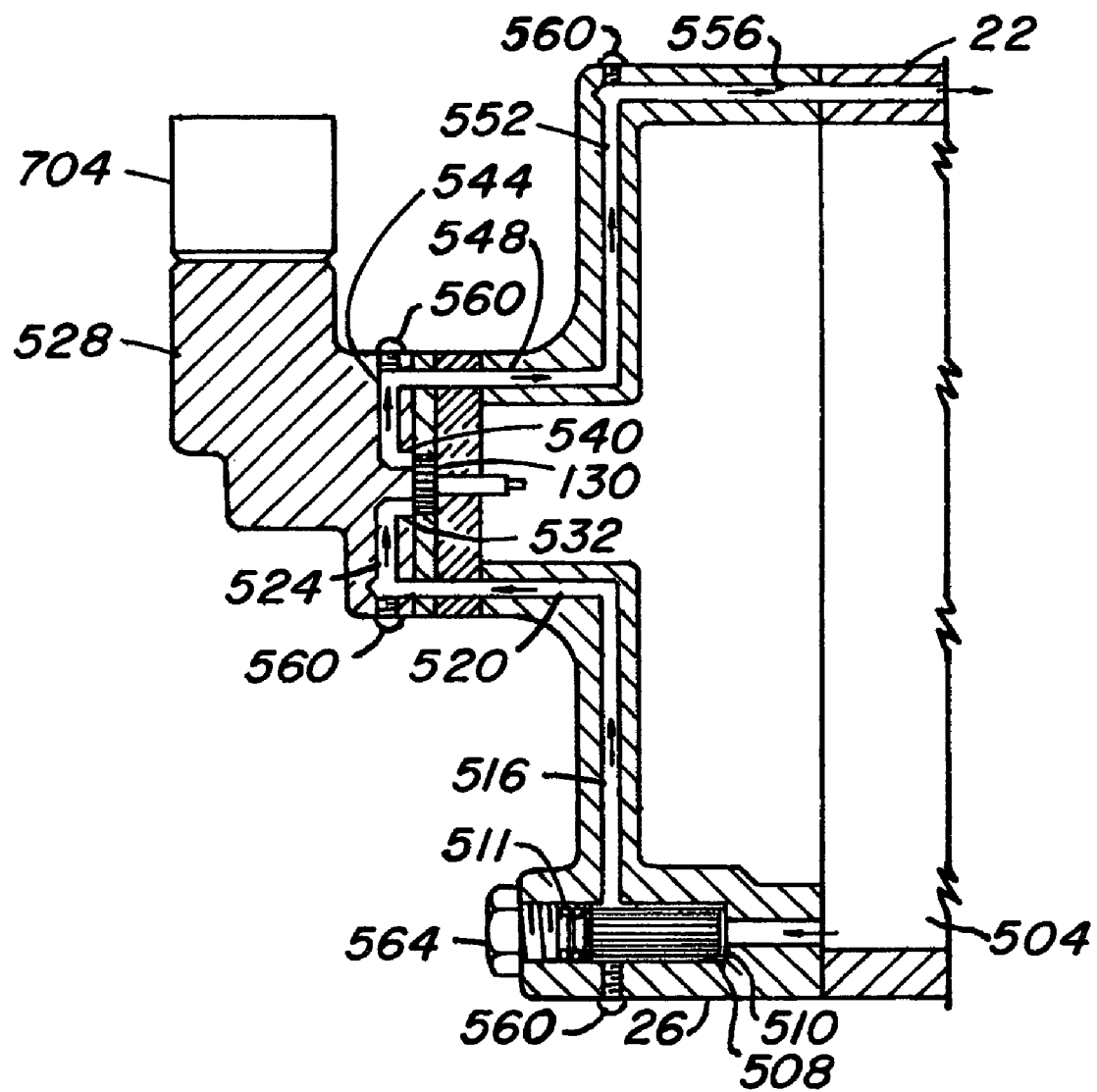
FIG. 9 depicts a partial cross sectional view of the gear pump and housing shown in FIG. 8.

Referring to FIGS. 8 and 9, partial cross sectional views of the brake apparatus 10 show the hydraulic fluid porting of FIG. 7 in further detail. The oil filter 508 is positioned relative to the chain cases 22 and 26, such that the oil filter 508 is located near the bottom of the oil sump 504, and therefore is submerged in oil due to gravity. The filter 508 is sealed to the front chain case 26 by gasket 510 that is compressed by spring 511. A first suction port 516 in the front chain case 26 ports oil from the filter 508 towards the gear pump 500, it is then ported through a second suction port 520, which is perpendicular to the first suction port 516, and is connected to a third suction port 524 formed in a needle housing 528. The third suction port 524 connects to a forth suction port 532 that forms the inlet to the gear pump 500. Thus, the suction port 502 of FIG. 7 comprises: first suction port 516, second suction port 520, third suction port 524 and forth suction port 532. As the drive gear 130 of the gear pump 500 is rotated it meshes with and drives the driven gear 132 thereby generating an increasing volume that draws oil in from the forth suction port 532 and a decreasing volume that forces oil out through a first pressure port 540. The first pressure port 540 connects the outlet of the gear pump 500 in parallel to the needle valve 700, piston cavities 454 and the stator pressure cavity 426. Thus, the pressure port 512 of FIG. 7 comprises: first pressure port 540, second pressure port 544, third pressure port 548, forth pressure port 552, fifth pressure port 556, sixth pressure port 446, seventh pressure port 442 and a needle pressure port 712. Plugs 560 are used to prevent oil leakage from through holes drilled in the various housings, and plug 564 plugs the access hole for the filter 508.

Since the gear pump 500 is continuously pumping oil, whenever the driven members are rotating, all of the outlet flow of the gear pump 500 is ported to oil sump 504 when there is no braking action. Thus, no pressure is generated or supplied to either the piston cavities 454 or the stator pressure chamber 426. With no pressure supplied to the piston cavities 454 the brake pads 74 are not urged against the braking surfaces 330, 334 and no braking action is initiated. Additionally, with no pressure supplied to stator pressure chamber 426, the stator spring 406 extends urging the stator assembly 356 towards the drive plate 308 to close off the cooling fluid flow path 440, thereby not permitting the cooling fluid to be pumped. Conversely, when braking action is initiated, the needle valve 700 (FIG. 10), ported in parallel with the piston cavities 454 and the stator pressure chamber 426, moves toward a closed position, which generates pressure in the pressure port 512.

Figure 10:
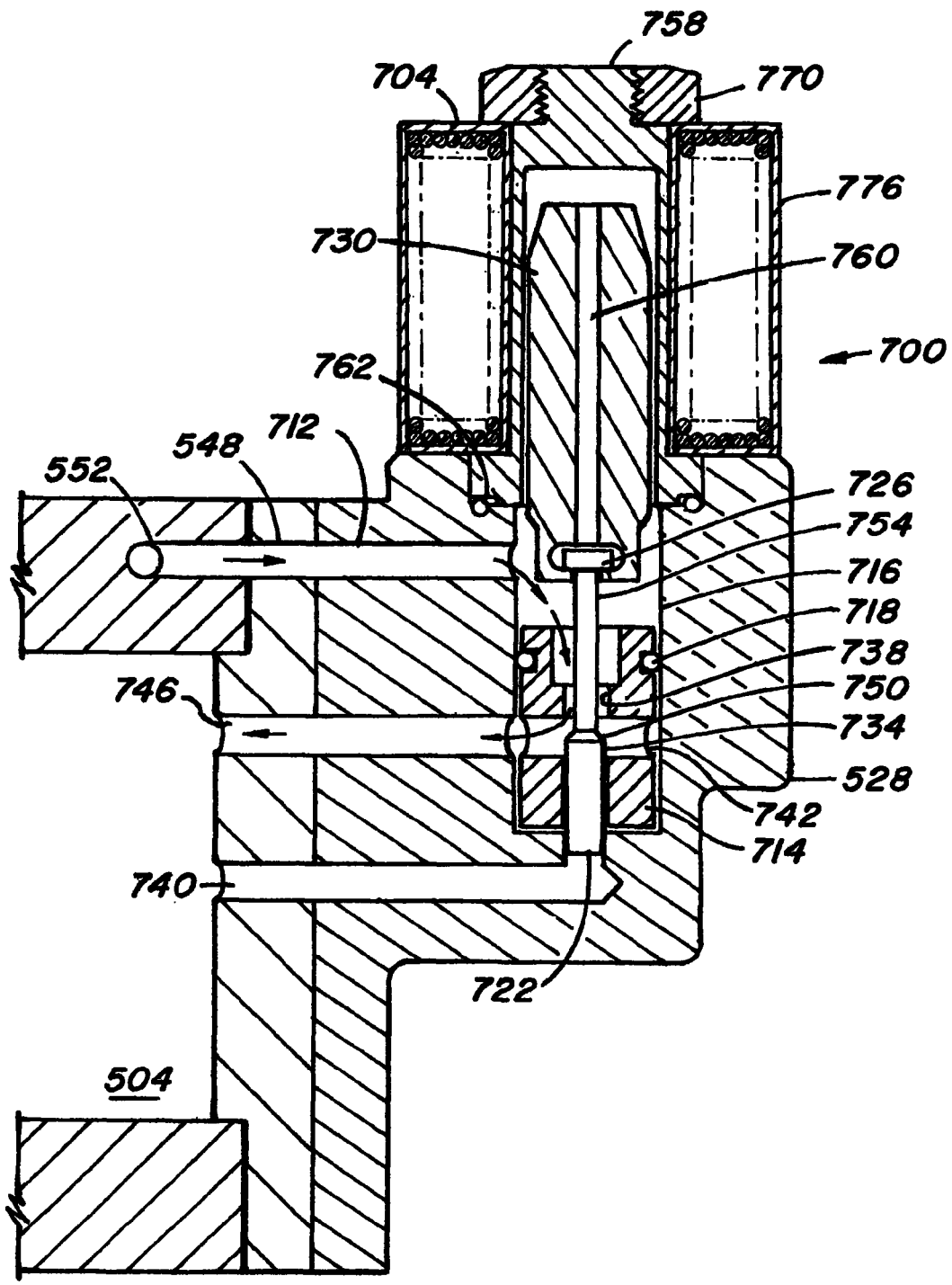
FIG. 10 depicts a cross sectional view of a needle valve of an embodiment of the invention.

Referring now to FIGS. 8 through 10, oil flows into the needle valve 700 through inlet needle pressure port 712, which is connected to the outlet of the gear pump 500 (FIG. 8) via the first pressure port 540 (FIG. 9), the second pressure port 544 (FIG. 9) and third pressure port 548. The needle pressure port 712 is connected to a needle cavity 716 in the needle housing 528. A seat insert 714 is sealed to the lower portion of the needle cavity 716 with O-ring 718. An outside diameter 734 of the needle 722 slidably and sealingly engages an inside diameter 738 of the seat insert 714. A needle drain port 740 connects the inside diameter 738 to the oil sump 504 to vent the needle 722 within the insert 714 and needle housing 528. Cross-holes 742 in the seat insert 714 connect the inside diameter 738 to a needle sump port 746 that connects to the oil sump 504. A tapered needle seat 750 ramps the outside diameter 734 of the needle 722 to a neck 754 of a smaller diameter. Thus, with the needle valve 700 in the opened positions, oil is free to flow; in through the needle pressure port 712, to the cavity 716, through the inside diameter 738, through the cross holes 742, to the needle sump port 746, and out to the oil sump. Therefore, the needle valve 700 is fully opened when the needle seat 750 is below the cross-holes 742 of the seat insert 714 such that oil is able to freely flow from the cavity 716 to the oil sump 504 resulting in no backpressure to the gear pump 500.

A solenoid 704, attached to the needle valve 700, is used to partially close the needle valve 700 resulting in an increase of the oil pressure of the system. The needle 722, is suspended from a plunger 730, of the solenoid 704, by a head 726. The plunger 730 that captures the needle head 726 is free to move, in a direction parallel to the axis of the needle 722, within a plunger tube 758. A hole 760 in the plunger 730 allows oil and air to flow therethrough, pressure balancing the plunger 730 within the plunger tube 758. The plunger tube 758 is threadably attached to the needle housing 528 and is sealed to the needle housing 528 with an O-ring 762. A coil 776 of the solenoid 704 abuts the needle housing 528 and circumferentially encases the plunger tube 758. A nut 770 threadably engaged to the plunger tube 758 retains the coil 776 to the needle valve 700.

Energizing the coil 776 in the solenoid 704 generates a magnetic field that attracts the metal of the plunger 730, which is normally positioned substantially below the coil 776 because of gravity and oil pressure acting over the area of the needle seat 750. The magnetic attraction causes the plunger 730 to lift and move axially towards the center of the coil 766. Oil pressurized by the gear pump 500 acts against the tapered needle seat 750 in a direction opposite that of the magnetic force on the plunger 730. As the magnetic force on the plunger 730 increases, so does the pressure in the pressure port 512. Thus, by controlling the strength of the magnetic field, the braking force is controlled. This embodiment has a fail-safe condition, in which, a failure of the electrical signal to the solenoid will result in the brake not braking at all. Additionally, this embodiment allows for limiting the maximum braking force that may be applied, by setting the maximum force of the solenoid 704 relative to the force due to pressure acting on the tapered seat 750 of the needle 722. In this instance the solenoid serves as a hydraulic fluid pressure relief valve.

Figure 11:
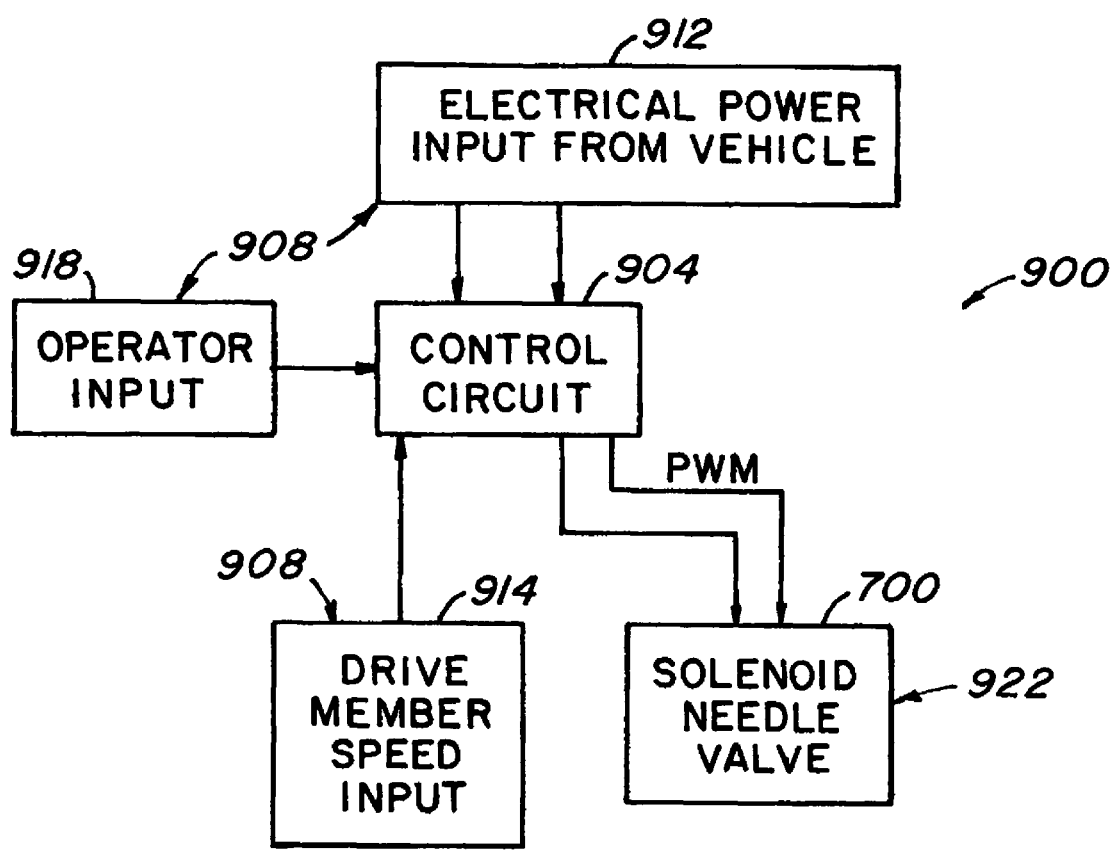
FIG. 11 depicts a block diagram of a control system of an embodiment of the invention.

Referring to FIG. 11, a control system 900 is used to control the electrical power supplied to the solenoid, thereby controlling the braking performed by the brake apparatus 10. The heart of the control system 900 is a control circuit 904 which may be, for example, a microprocessor. The control circuit 904 may have several inputs 908 including; electrical power 912 supplied from the vehicle's power system, a driven member speed input 914 which may be supplied from the vehicle's computer or it may be supplied as pulses from a pick up such as a magneto or hall effect device attached to the brake apparatus 10 (of FIG. 1) (this option will be discussed in more detail below) and an operator input 918. The operator input 918 may provide a signal proportional to the level of braking desired by the vehicle operator through an input device such as a manually activated lever or through tapping into a brake pedal position sensor (not shown) for example. An output 922 of the control circuit 904 may be an electronic pulse width modulated (PWM) signal, for example. Such a signal to the solenoid 704 may generate a magnetic field strength, and a corresponding braking force, that varies depending on the duty cycle of the PWM signal. It should be appreciated by those skilled in the art, that alternate embodiments such as a voltage controller, for example, may be used to control the solenoid 704 while remaining within the scope of the invention.

The driven member speed input 914 permits the control circuit 904 to adjust the braking force through the PWM output based on feedback received by the driven member speed input 914. For example, a setting for maintaining a specific and constant drive member speed could be inputted by the operator. This constant speed mode would permit the operator to set a desired driven member speed to be maintained during a condition when the driver of the driven member is attempting to increase the speed of the driven member. Such a constant speed mode may be useful, when descending a grade, and instead of the operator manually adjusting the brake pedal to maintain a constant vehicle speed, the brake apparatus 10 would automatically adjust the braking force, thus creating a braking 'cruise control'. This constant speed mode requires the control system 900 to receive an input 908 of the speed of the driven member 914 and in response send a PWM signal to the solenoid 704 to maintain the specified driven member speed.

Referring back to FIG. 6, an embodiment of the invention showing one possible location for a driven member speed pick up is shown. One or more magnets 926, attached to the axial end of the rotor sprocket 50, will rotate with the rotational speed of the universal joint coupling 34 of FIG. 1. A magnetic field sensor 930, attached to a the gear plate 934, may be positioned to pick up the magnetic field of the magnet 926, as it passes in proximity to the sensor 930, during each revolution of the rotor sprocket 50 thereby creating a drive member speed input 914. The magnetic field sensor 930 may be a Hall effect circuit or a magneto coil, for example, or any other magnetic field detecting sensor. Referring to FIG. 11, the control circuit 904 may use the output of the sensor 930 as feedback to control the rotational speed of the universal joint coupling 34 through control of the brake apparatus 10 of FIG. 1.

By having the drive member speed input device 908 integrated into the brake apparatus 10 an embodiment of the invention may be attached to an existing vehicle without having to tap into the vehicle's electrical system to acquire a drive member speed input 908. It may be desirable to attach the brake apparatus 10 to existing vehicles with little or no changes required of the vehicle hardware. The offset axis arrangement defined by having the axis of the brake rotor 300 offset from the axis of the vehicle's tail shaft 36, allows the application of the brake apparatus 10 to the vehicle without requiring modifications to the vehicle's drive-shaft (not shown). Accordingly, the universal joint coupling 34 attaches directly to the vehicle's drive shaft universal joint (not shown). Additionally, the bolt hole pattern of the tail housing 30 is designed to match the bolt hole pattern of the vehicle's transmission (not shown) from which the tail shaft 36 protrudes. The band clamp 33 fixes the tail housing 30 relative to the front chain case 26 in any rotational orientation. This angular adjustability allows for installation variations without requiring additional customization during the installation process.

Various embodiments of the invention may have some of the following advantages: a frictional braking apparatus that does not overheat, on board cooling fluid pump, on board hydraulic fluid pump, on board pressure control valve, automatic activation and deactivation of cooling fluid pump, braking force control system, constant driven member speed control system, a non-braking failsafe condition for any electrical system failure, an integrated hydraulic pressure relief feature, inherently pressure limited, and a closed hydraulic system with all in housing hydraulic porting (no hydraulic hoses), an offset drive configuration, allowing an aftermarket installation in a driveline of certain vehicles, without requiring driveshaft modification, and enhanced serviceability of rotor and seal components.

While the embodiments of the disclosed method and apparatus have been described with reference to exemplary embodiments, it will be understood by those skilled in the art that various changes may be made and equivalents may be substituted for elements thereof without departing from the scope of the embodiments of the disclosed method and apparatus. In addition, many modifications may be made to adapt a particular situation or material to the teachings of the embodiments of the disclosed method and apparatus without departing from the essential scope thereof. Therefore, it is intended that the embodiments of the disclosed method and apparatus not be limited to the particular embodiments disclosed as the best mode contemplated for carrying out the embodiments of the disclosed method and apparatus, but that the embodiments of the disclosed method and apparatus will include all embodiments falling within the scope of the appended claims.

What is claimed is:

1. A liquid cooled brake apparatus comprising:
   a housing;
   a brake cooling pump mounted to said housing;
   one or more driven members supported by the housing;
   a braking force actuator mounted to said housing, said braking force actuator being driven by the one or more driven members, the braking force actuator being configured and disposed to pressurize fluid;
   a brake rotor rotationally fixed relative to the one or more driven members;
   a braking force applicator in operable communication with said braking force actuator and the brake rotor; and
   a control system in operable communication with the braking force actuator and the braking force applicator, the control system including a solenoid configured and disposed to control fluid pressure transfer between the braking force actuator and the braking force applicator in order to control speed of the brake rotor.

2. The apparatus of claim 1 wherein the brake rotor is formed of at least two parts sealed together forming a cavity therebetween, the cavity being configured and disposed to contain a cooling fluid.

3. The apparatus of claim 2 wherein the brake rotor includes exterior axially opposing surfaces that define brake surfaces.

4. The apparatus of claim 1 wherein the brake cooling pump is disposed in the brake rotor.

5. The apparatus of claim 4 wherein the cooling pump comprises blades on opposing surfaces of a disc axially bisecting a rotor cavity, the cooling fluid being configured and disposed to flow radially outward on a first side of said disc and radially inward on a second side of said disc and radially into a stator assembly.

6. The apparatus of claim 5 wherein the stator assembly is axially movable relative to the disc to close a coolant flow path in response to the stator assembly being in a first position and to open the coolant flow path in response to the stator assembly being in a second position.

7. The apparatus of claim 6 wherein the movement of the stator assembly from the first position to the second position is actuated by the braking force actuator.

8. The apparatus of claim 1 wherein the braking force actuator is a gear pump.

9. The apparatus of claim 8 wherein the gear pump is configured and disposed to pressurize fluid in piston cavities to urge pistons against brake pads that frictionally engage brake surfaces.

10. The apparatus of claim 8 wherein a needle valve is configured and disposed to control porting of fluid transferred by the gear pump.

11. The apparatus of claim 10 wherein the needle valve is configured and disposed to be controlled by the solenoid.

12. The apparatus of claim 11 wherein the solenoid is configured and disposed to be controlled by a pulse width modulated (PWM) control circuit in response to input from an operator.

13. The apparatus of claim 12 wherein the control circuit is configured and disposed to maintain a constant driven member speed.

14. The apparatus of claim 1 wherein the rotor is rotationally fixed to the one or more driven members by a chain.

15. The apparatus of claim 1 wherein the brake apparatus is configured and disposed to fit onto a vehicle without requiring modification to a driveshaft of the vehicle.

16. The apparatus of claim 1 wherein an angular offset of an axis of the rotor is configured and disposed to be adjustable relative to an axis of the one or more driven members by a clamp.

17. The apparatus of claim 1 wherein only one external dynamic seal is utilized.

18. A method of retarding a driven member comprising:
   driving a braking force actuator with one or more driven members;
   actuating a braking force applicator;
   controlling fluid pressure transfer between the braking force actuator and the braking force applicator with a solenoid; retarding the rotation of a rotor rotationally fixed to the one or more driven members through operation of the braking force applicator; internally cooling the rotor with a cooling fluid; pumping the cooling fluid in response to rotation of the rotor; and preventing the pumping of cooling fluid, by repositioning a stator assembly in response to a decrease in fluid pressure from the braking force actuator.

19. The method of claim 18 further comprising:
   controlling the rotor speed; through
   controlling actuation of the braking force applicator; through
   controlling a needle valve, through controlling the solenoid.

20. The apparatus of claim 1, wherein the brake cooling pump is configured and disposed to reduce cooling fluid flow when the liquid cooled braking apparatus is not engaged in speed control of the rotor.

* * * * *